(12) United States Patent
Bandholz et al.

(10) Patent No.: US 6,816,939 B2
(45) Date of Patent: Nov. 9, 2004

(54) APPARATUS FOR SUPPORTING I²C BUS MASTERS ON A SECONDARY SIDE OF AN I²C MULTIPLEXOR

(75) Inventors: Justin Potok Bandholz, Apex, NC (US); Jimmy Grant Foster, Sr., Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 10/142,326

(22) Filed: May 9, 2002

(65) Prior Publication Data

US 2003/0212847 A1 Nov. 13, 2003

(51) Int. Cl.[7] ............................. G06F 13/14; G06F 3/00
(52) U.S. Cl. ......................... 710/305; 710/107; 710/38
(58) Field of Search ............................... 710/300, 107, 710/108, 305, 306, 311, 313, 314, 316, 317, 36, 38

(56) References Cited

U.S. PATENT DOCUMENTS

| | | | |
|---|---|---|---|
| 5,333,276 A | | 7/1994 | Solari |
| 5,455,915 A | | 10/1995 | Coke |
| 5,526,497 A | * | 6/1996 | Zilka et al. ................... 710/316 |
| 5,619,661 A | | 4/1997 | Crews et al. |
| 5,640,521 A | | 6/1997 | Whetsel |
| 5,892,933 A | | 4/1999 | Voltz |
| 5,898,891 A | | 4/1999 | Meyer |
| 5,991,833 A | | 11/1999 | Wandler et al. |
| 6,052,754 A | | 4/2000 | Anand |
| 6,134,679 A | | 11/2000 | Liddell et al. |
| 6,233,635 B1 | * | 5/2001 | Son ............................. 710/315 |
| 6,253,268 B1 | * | 6/2001 | Bjorkengren et al. ........ 710/105 |
| 6,301,623 B1 | * | 10/2001 | Simpson et al. ............. 709/253 |
| 6,339,806 B1 | * | 1/2002 | Foster et al. ................. 710/313 |
| 6,438,624 B1 | * | 8/2002 | Ku et al. .......................... 710/9 |
| 6,622,188 B1 | * | 9/2003 | Goodwin et al. ............ 710/105 |
| 2003/0135679 A1 | * | 7/2003 | Tangen ......................... 710/300 |

* cited by examiner

Primary Examiner—Tim Vo
Assistant Examiner—Trisha Vu
(74) Attorney, Agent, or Firm—Dillon & Yudell, LLP

(57) ABSTRACT

An apparatus for supporting I²C bus masters on a secondary side of an I²C mulitplexor is disclosed. An electronic system includes a primary serial bus, multiple secondary serial buses, an expander, multiple direction latches, a multiplexor, multiple busy detect circuits, and a to-from multiplexor circuit. The expander, which is coupled to the primary serial bus, includes multiple outputs that can be selectively activated. Each of the direction latches is coupled to a respective one of the outputs of the expander. The multiplexor, which is coupled to the direction latches, includes several outputs connected to the secondary serial buses such that the secondary serial buses can be selectively connected to the primary serial bus. Each of the busy detect circuits is coupled to a respective one of the outputs of the multiplexor. The busy detect circuits detects if there is a transaction occurring on one of the outputs of the multiplexor. In response to a transaction occurring on one of the outputs of the multiplexor, the to-from multiplexor circuit selects one of the busy detect circuits that is involved in the transaction in order to allow one of the direction latches to latch at a correct time such that any bus corruption on the secondary serial buses can be avoided.

12 Claims, 5 Drawing Sheets

APPARATUS FOR SUPPORTING I²C BUS MASTERS ON A SECONDARY SIDE OF AN I²C MULTIPLEXOR

BACKGROUND OF THE INVENTION

1. Technical Field

The present invention relates to a primary serial bus coupled to multiple secondary serial buses in general, and in particular to an I²C primary bus coupled to multiple secondary I²C buses. Still more particularly, the present invention relates to an apparatus for supporting I²C bus masters on a secondary side of an I²C mulitplexor.

2. Description of the Related Art

An inter-integrated circuit (I²C) bus is a well-known industry standard serial bus for interconnecting various integrated circuit devices within a data processing system. A standard I²C bus includes two lines, namely, an SDA line and an SCL line. The SDA is for transmitting start, address, data, control, acknowledge and stop information, and the SCL line is for carrying a clock signal.

Generally speaking, a bus master transmits a start bit followed by 8 bits—7 address bits and 1 read/write bit. Of the 7 address bits, 4 bits are preprogrammed by a chip manufacturer, and the remaining 3 bits are typically programmed by a system manufacturer. Because the chip manufacturer pre-programs the most significant 4 bits of a 7-bit address, leaving only 3 programmable address bits for the system manufacturer, an electronic system is usually limited to having a maximum of $2^3$ (i.e., 8) of the same type of chip connected to any one I²C bus.

Following the transmission of the address and read/write bits, the addressed bus slave responds with an acknowledge (ACK) bit. Next, the bus master transmits 8 bits of data, which is again followed by the transmission of an ACK from the bus slave. The pattern of 8 data bits followed by an ACK bit can be repeated until all data has been transmitted. The transmission can be terminated at any time via a transmission of a stop bit.

Bus loading is a limitation as to the total number of devices that can be coupled to any one bus. Because of bus loading and the intrinsic inability to address more than 8 of the same type of chip on any one I²C bus, system manufacturers have previously incorporated more than one I²C bus, and there are two general approaches to interconnect multiple I²C buses within an electronic system.

The first approach is to use multiple primary I²C buses, each with its own controller. Although the first approach solves the problems of bus loading and address availability, it requires additional I²C controllers that are usually the most expensive device in an electronic system having an I²C bus. In addition, the requirement of running multiple primary I²C buses through many connectors and interfaces adds cost and, in some cases, is not possible because of the limited pin count of the connectors and interfaces.

The second approach is to use one primary I²C bus multiplexed with two or more secondary I²C buses, but controlled separately from any of the secondary I²C buses. The second approach is an improvement over the first approach because it does not require additional controllers and it is not constrained to run through multiple connectors and interfaces. However, a separate mechanism must be set up to control the multiplexing. In addition, since the primary I²C bus is switched under the second approach, it must be controlled from a different primary I²C bus; otherwise, data loss and signal quality degradation will occur. The need for more than one primary I²C bus limits the total benefits of the second approach.

Furthermore, the original I²C mulitplexor was generally lacking support for multiple bus masters on the secondary side of the I²C mulitplexor. If an I²C bus master was placed on the secondary side of the I²C mulitplexor, a bus collision might occur if there was master activity on the secondary side and the I²C mulitplexor were switched to that particular secondary I²C bus. A straight-forward solution to the above-mentioned problem is to remove the offending secondary I²C bus master, but a better solution is preferred.

The present disclosure provides an improved method and apparatus to support I²C bus masters on a secondary side of an I²C mulitplexor.

SUMMARY OF THE INVENTION

In accordance with a preferred embodiment of the present invention, an electronic system includes a primary serial bus, multiple secondary serial buses, an expander, multiple direction latches, a multiplexor, multiple busy detect circuits, and a to-from multiplexor circuit. The expander, which is coupled to the primary serial bus, includes multiple outputs that can be selectively activated. Each of the direction latches is coupled to a respective one of the outputs of the expander. The multiplexor, which is coupled to the direction latches, includes several outputs connected to the secondary serial buses such that the secondary serial buses can be selectively connected to the primary serial bus. Each of the busy detect circuits is coupled to a respective one of the outputs of the multiplexor. The busy detect circuits detects if there is a transaction occurring on one of the outputs of the multiplexor. In response to a transaction occurring on one of the outputs of the multiplexor, the to-from multiplexor circuit selects one of the busy detect circuits that is involved in the transaction in order to allow one of the direction latches to latch at a correct time such that any bus corruption on the secondary serial buses can be avoided.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
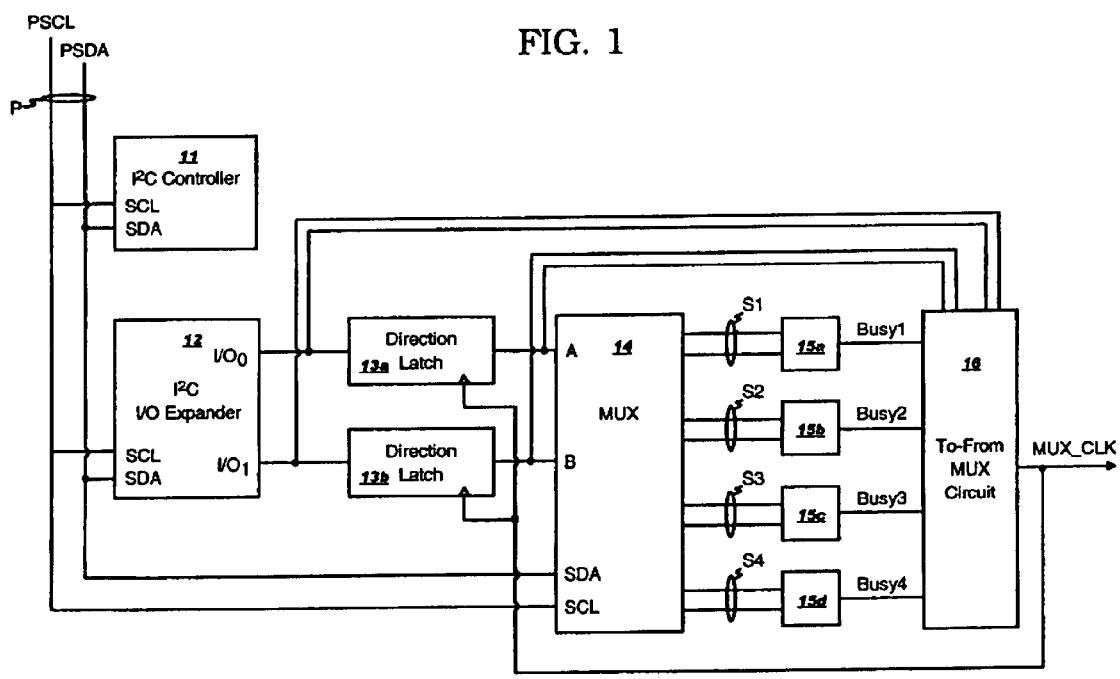
FIG. 1 is a block diagram of an electronic system having an I²C bus, in accordance with a preferred embodiment of the current invention.

Referring now to the drawings and in particular to FIG. 1, there is depicted a block diagram of an electronic system having an I²C bus, in accordance with a preferred embodiment of the current invention. As shown, an electronic system 10 includes an I²C bus controller 11, an I/O expander 12, two direction latches 13a–13b, a multiplexor 14, four busy detect circuits 15a–15d, and a to-from multiplexor circuit 16. I²C bus controller 11 includes an SDA port and an SCL port connected, respectively, to a Primary SDA (PSDA) line and a Primary SCL (PSCL) line of a primary I²C bus P. Similarly, I/O expander 12 includes an SDA port and an SCL port connected, respectively, to the PSDA and PSCL lines of the primary I²C bus P. Outputs I/O$_0$ and I/O$_1$ of I/O expander 12 are connected, respectively, to an input of a direction latch 13a and an input of a direction latch 13b. The outputs of direction latch 13a and direction latch 13b are connected to multiplexor 14. Multiplexor 14 provides four sets of secondary I²C bus, namely, S1, S2, S3 and S4. Multiplexor 14 is used to selectively connect the primary I²C bus P to one of the four sets of secondary I²C bus S1 through S4. Each set of secondary I²C bus, which includes an SDA line and an SDL line, is connected to a respective one of busy detect circuits 15a–15d. To-from mulitplexor circuit 16 combines the outputs of busy detect circuits 15a–15d to generate a MUX_CLK signal.

Figure 2:
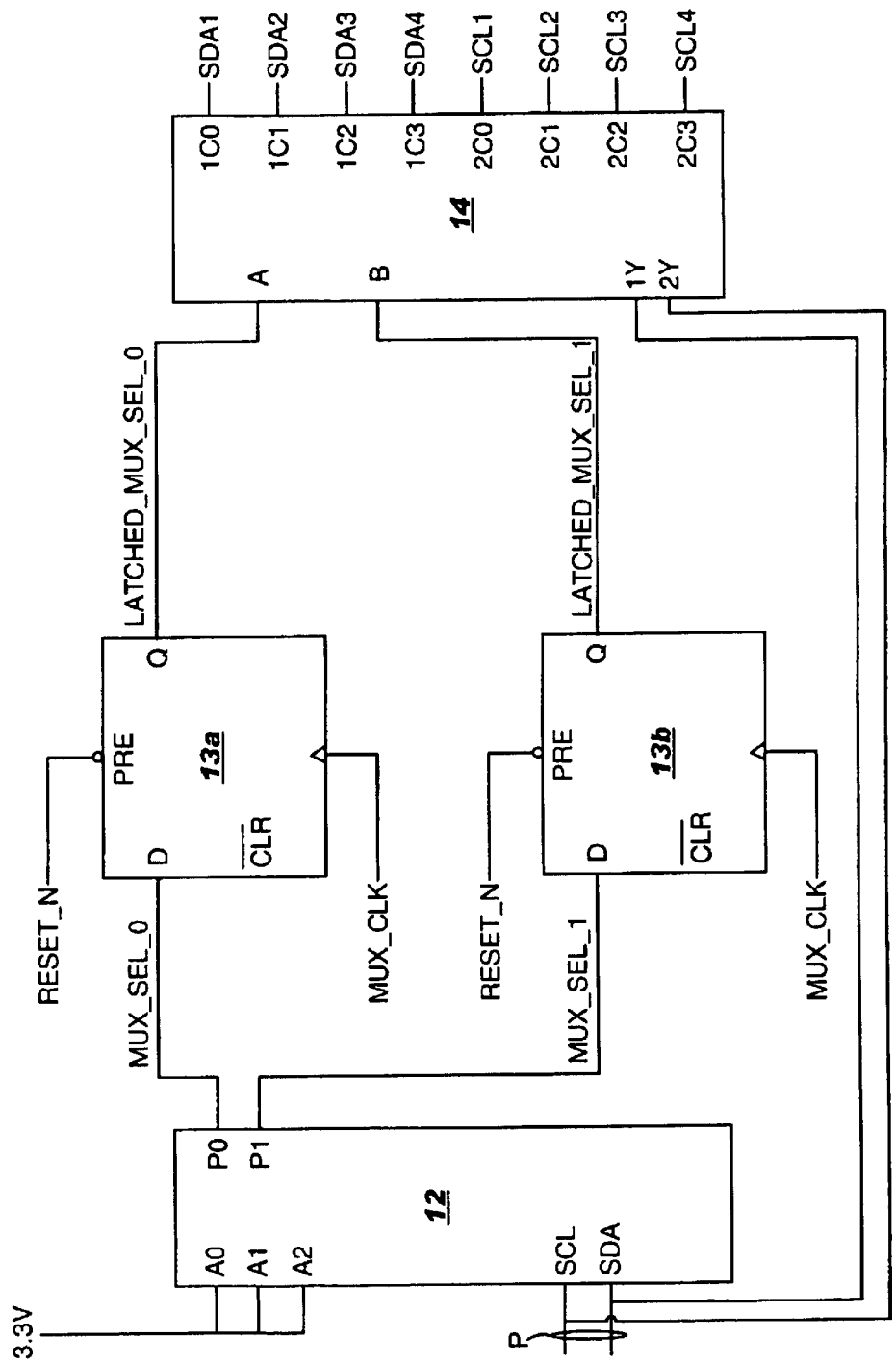
FIG. 2 is a detailed block diagram of the I/O expander, direction latches and multiplexor from FIG. 1, in accordance with a preferred embodiment of the present invention.

With reference now to FIG. 2, there is illustrated a detailed block diagram of I/O expander 12, direction latches 13a–13b and multiplexor 14, in accordance with a preferred embodiment of the present invention. I/O expander 12, such as the Philips PCF8574 or PCA9557, is an I²C slave device. I/O expander 12 includes an I²C bus interface and 8 output ports (only ports P0 and P1 are shown). A0, A1 and A2 inputs of I/O expander 12 are connected to either V+ or ground to set the lower order address bits of I/O expander 12. As mentioned previously, the four high-order address bits of an I²C bus device are pre-programmed by a chip manufacturer and are not available for programming by a system designer. Thus, I/O expander 12, like other I²C bus devices, responds to a 7 bit address directed to I/O expander 12 over the primary I²C bus P, with the three least significant bits being set by the system manufacturer and the four most significant address bits being pre-programmed by the chip manufacturer. When a transaction is sent to I/O expander 12, the 8 output ports mirror the byte of the transaction that was sent to I/O expander 12 (most significant bit first). In the present invention, the two least significant bits (from ports P0 and P1) are defined as the select lines, namely, MUX_SEL_0 and MUX_SEL_1, for multiplexor 14. MUX_SEL_0 is connected to an input D of direction latch 13a, and MUX_SEL_1 is connected to an input D of direction latch 13b.

The output ports P0 and P1 of I/O expander 12 transition during an ACK cycle of a write transaction to I/O expander 12. This behavior is critical. Since the MUX_CLK signal goes high on a STOP condition, MUX_SEL_0 and MUX_SEL_1 must be valid at direction latch 13a before the STOP occurs. Optionally, a SWITCH_DONE signal may be driven into I/O expander 12 to allow the system to read the status of the switch event.

Direction latches 13a–13b are preferably D-type flip-flops. The output of direction latch 13a is LATCHED_MUX_SEL_0, and the output of direction latch 13b is LATCHED_MUX_SEL_1. The outputs of direction latch 13a–13b are respectively connected to the select inputs A and B of multiplexor 14. A RESET_N signal is connected to a preset input (PRE) of each of direction latches 13a–13b. The clock inputs of direction latches 13a–13b are driven by a MUX_CLK signal to ensure that mulitplexor 14 will only change when there is no activity on the monitored I²C buses. Direction latches 13a–13b latch MUX_SEL_0 and MUX_SEL_1 after an IDLE condition is detected on the secondary I²C buses.

Multiplexor 14, which is preferably a FET switch multiplexor (a quickswitch multiplexor) such as a Quality Semiconductor QS3257, connects primary I²C bus P to one or more sets of secondary I²C buses. In the present embodiment, multiplexor 14 connects one primary I²C bus P to four sets of secondary I²C buses S1–S4. Since multiplexor 14 is a FET switch, data can travel in a bidirectional manner across the FET switch. Multiplexor 14 has two input ports, namely, input port 1Y and input port 2Y. Multiplexor 14's port 1Y is connected to a separate SDA line from each of the secondary I²C buses. Similarly, multiplexor 14's port 2Y is connected to a separate SCL line from each of the secondary I²C buses. In this way, each of the secondary I²C buses can be switched to the primary I²C bus by a single device. The outputs of multiplexor 14 are connected with the lowest numbered secondary I²C bus occupying the lowest port number. For example, SDA1 is connected to output 1C0, and SCL1 is connected to output 2C0. The select inputs A and B of multiplexor 14 are connected to the outputs of the direction latch so that the direction of multiplexor 14 will change only when the "to" and "from" I²C buses transition to IDLE. Port Enable inputs on multiplexor 14 are connected to GND in order to force the ports on.

Figure 3:
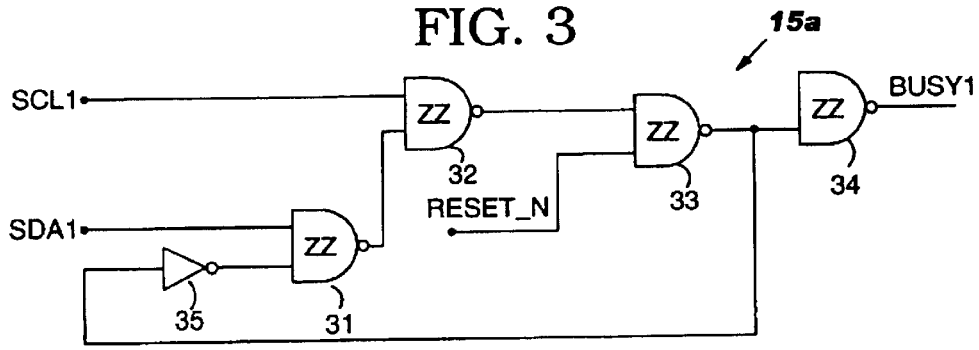
FIG. 3 is a detailed block diagram of the busy detect circuits from FIG. 1, in accordance with a preferred embodiment of the present invention.

Referring now to FIG. 3, there is depicted a detailed block diagram of busy detect circuit 15a, in accordance with a preferred embodiment of the present invention. As shown, busy detect circuit 15a is an asynchronous state machine that includes four Schmitt-triggered NAND gates 31–34 and one inverter 35. Busy detect circuit 15a determines if there is an activity, such as a transaction, on one of the secondary I²C buses.

When RESET_N=0, SCL=1, and SDA=1, the output of busy detect circuit 15a becomes 0, which corresponds to an initial RESET condition where no activity is on the I²C primary bus. The initial RESET condition initializes the state machine to a known good state and a well-defined output. Transitions on SCL and SDA when RESET_N=0 are allowed as long as the attached I²C bus is in an IDLE state when the rising edge of RESET_N occurs. SCL and SDA must be in a logical high state sufficiently long enough to allow busy detect circuit 15a (i.e., the state machine) to settle before the rising edge of RESET_N. Once out of RESET, busy detect circuit 15a drives the output (i.e., BUSY1) to a logical high when an START condition is detected and drive BUSY low when an STOP condition is detected. Busy detect circuit 15a will handle I²C REPEATED START conditions by continuing to drive a BUSY signal high.

Although only busy detect circuit 15a is illustrated in FIG. 3, it is understood busy detect circuits 15b–15d are identical to busy detect circuit 15a, with the exception of input and output signals. In FIG. 1, each of busy detect circuit 15a–15d is connected to a respective set of SCL and SDA lines of a secondary I²C bus. In an electronic system that supports more secondary I²C buses, a busy detect circuit would be attached to each of those additional buses. The RESET_N from each of busy detect circuits 15a–15d is bused together and driven low when the electronic system is being powered up. The system designer must make sure that the I²C buses are in an IDLE state before RESET_N is driven high. The system designer may also want to toggle RESET_N when the system power is already good. This behavior is supported as long as all the previously stated reset conditions are met.

Figure 4:
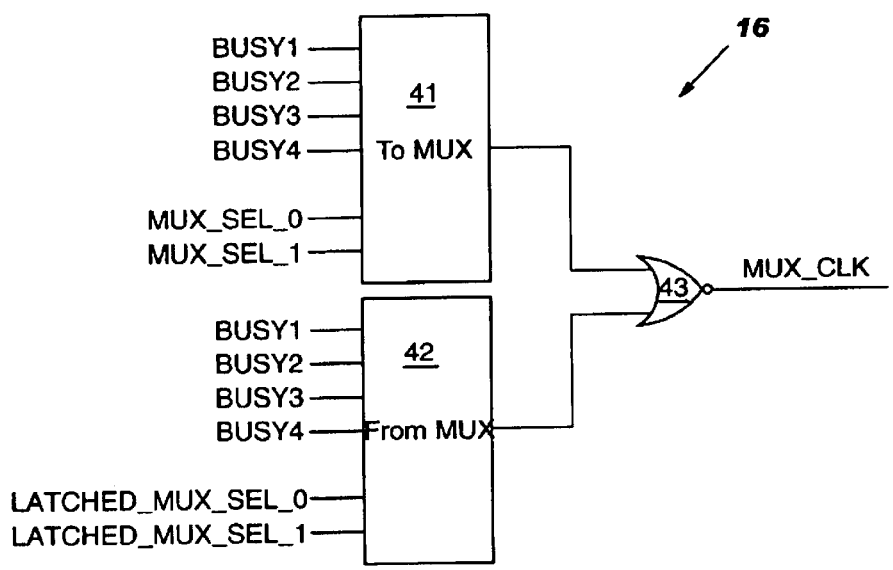
FIG. 4 is a detailed block diagram of the to-from multiplexor circuit from FIG. 1, in accordance with a preferred embodiment of the present invention.

With reference now to FIG. 4, there is depicted a detailed block diagram of to-from multiplexor circuit 16, in accordance with a preferred embodiment of the present invention. As shown, to-from multiplexor circuit 16 includes two 1×4 multiplexors 41 and 42. The outputs of busy detect circuits 15a–15d are connected to a respective input of multiplexors 41 and 42. Busy detect circuits 15a–15d are connected to multiplexors 41 and 42 in such a fashion as the lowest order busy detect circuit is connected to the lowest order input on multiplexors 41 and 42. In this example, the output of busy detect circuit 15a (i.e., BUSY1) is connected to input 0 of multiplexors 41 and 42. The select lines of multiplexor 41 are driven directly by the outputs of I/O expander 12 (i.e., MUX_SEL_0 1 and MUX_SEL_1). The select lines of multiplexor 42 are driven by the outputs of direction latches 13a and 13b (i.e., LATCHED_MUX_SEL_0 and LATCHED_MUX_SEL_1). The outputs of multiplexors 41 and 42 are combined by a logical NOR gate 43 to form a MUX_CLK signal to be used as a latch control for direction latches 13a and 13b.

The function of to-from multiplexor circuit 16 is to select the two I²C buses that will be monitored during a bus switch. In other words, to-from multiplexor circuit 16 selects the proper busy detect circuits involved in a transaction. Since to-from multiplexor circuit 16 selects inputs that are driven directly from I/O expander 12, it will pass the BUSY signal that corresponds to the I²C bus to which the present invention intends to switch. Likewise, to-from multiplexor circuit 16 passes the BUSY signal that corresponds to the I²C bus from which the present invention intends to switch. Thus, during operation, MUX_CLK signal is high when no activity exists on either the "to" or "from" I²C secondary bus. MUX_CLK signal is low when activity occurs on either the "to" or "from" I²C secondary bus. In this way, the rising edge of MUX_CLK signal will signify that both I²C buses have become IDLE.

Figure 5:
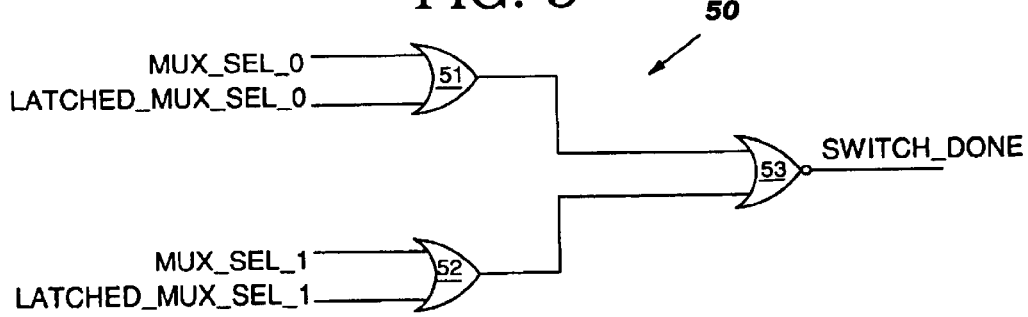
FIG. 5 is a block diagram of a switch done circuit in accordance with a preferred embodiment of the present invention.

Referring now to FIG. 5, there is illustrated a switch done circuit in accordance with a preferred embodiment of the present invention. As shown, a switch done circuit 50, which preferably includes two XOR gates 51–52 51–52 and a NOR gate 53, provides a SWITCH_DONE signal to notify external circuitry that a switch has been completed. The parts are connected in such a way as to drive a SWITCH_DONE signal low when the multiplexor select lines (i.e., MUX_SEL_0 and MUX_SEL_1) differ from the latched multiplexor select lines (i.e., LATCHED_MUX_SEL_0 and LATCHED_MUX_SEL_1), and to drive the SWITCH_DONE signal high when the multiplexor select lines are the same as the latched mulitplexor select lines.

Figure 6:
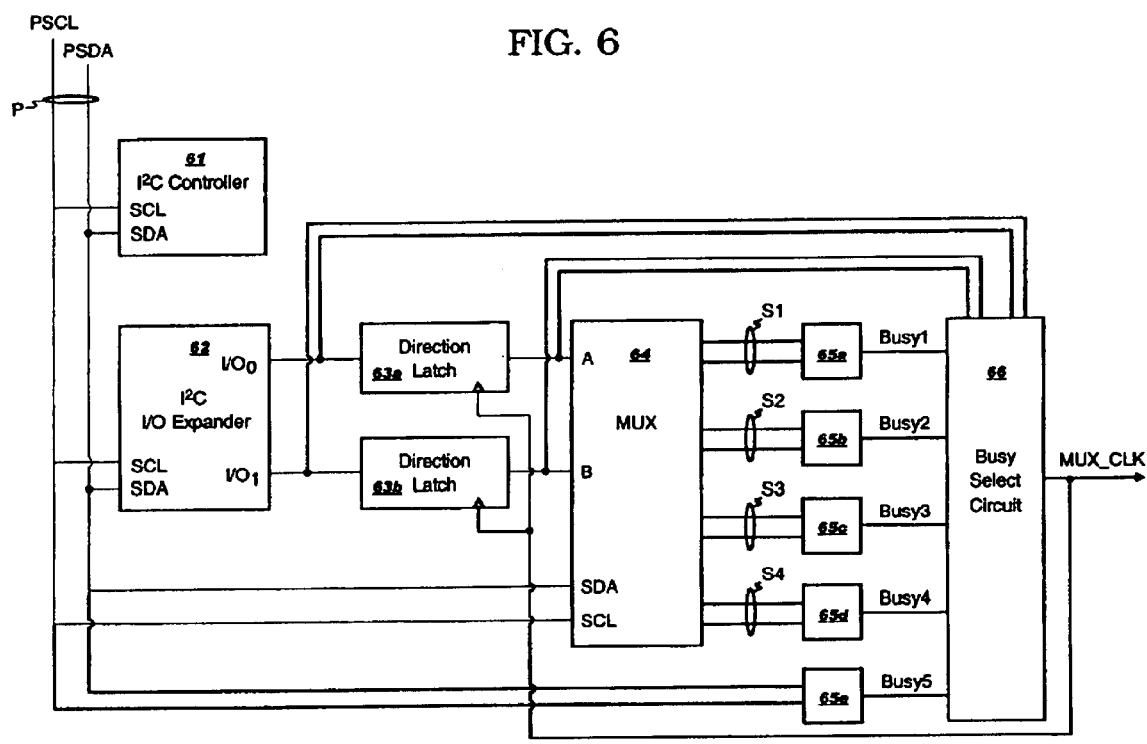
FIG. 6 is a block diagram of an electronic system having an I²C bus, in accordance with an alternative embodiment of the current invention.

With reference now to FIG. 6, there is illustrated a block diagram of an electronic system having an I²C bus, in accordance with an alternative embodiment of the current invention. As shown, an electronic system 60 includes an I²C bus controller 61, an I/O expander 62, two direction latches 63a–63b, a multiplexor 64, five busy detect circuits 65a–65e, and a busy select circuit 66. Electronic system 60 is very similar to electronic system 10 from FIG. 1, with the addition of a fifth busy detect circuit and a busy select circuit. Each set of secondary I²C buses, which includes an SDA line and an SDL line, is connected to a respective one of busy detect circuits 65a–65d. Busy detect circuit 65e is connected to primary I²C bus P. Busy select circuit 66 combines the outputs of busy detect circuits 65a–65e to generate a MUX_CLK signal.

Figure 7:
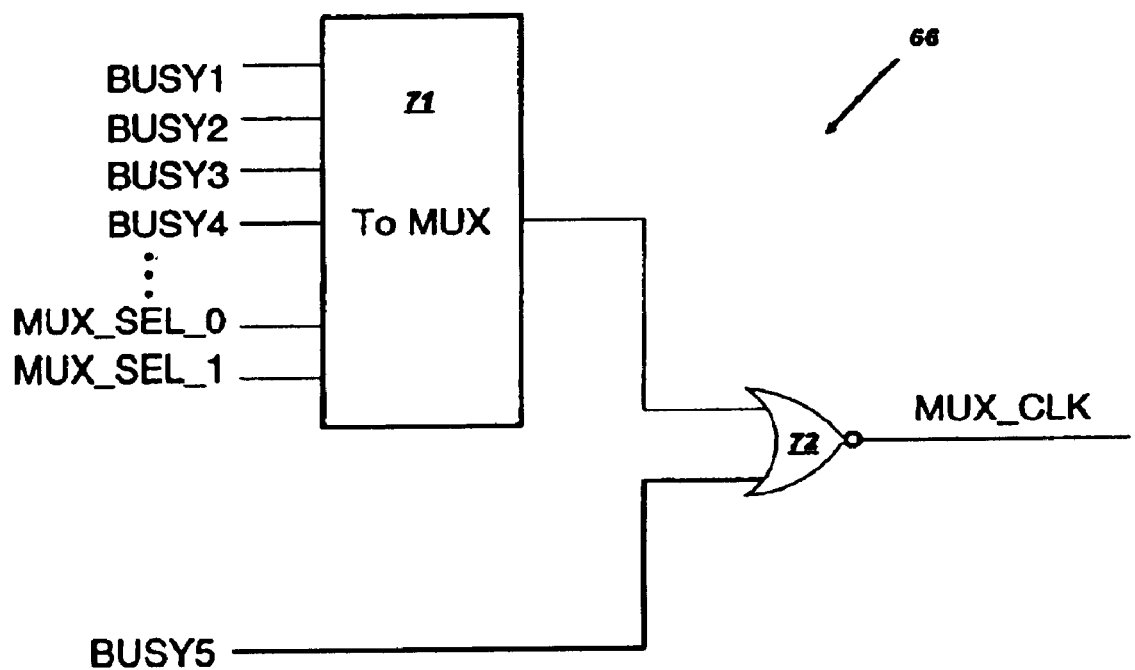
FIG. 7 is a detailed block diagram of the busy select circuit from FIG. 6, in accordance with a preferred embodiment of the present invention.

Referring now to FIG. 7, there is depicted a detailed block diagram of busy select circuit 66, in accordance with a preferred embodiment of the present invention. As shown, busy select circuit 66 includes a 1×4 multiplexor 71 and a NOR gate 72. The outputs of busy detect circuits 65a–65e are connected to the inputs of multiplexor 71. Busy detect circuits 65a–65e are connected to multiplexor 71 in such a fashion as the lowest order busy detect circuit is connected to the lowest order input on multiplexor 71. The select lines of multiplexor 71 are driven directly by the outputs of I/O expander 62 (i.e., MUX_SEL_0 and MUX_SEL_1). The output of multiplexor 71 is combined with a BUSY 5 signal from busy detect circuit 65d via NOR gate 72 to form a MUX_CLK signal to be used as a latch control for direction latches 63a and 63b from FIG. 6.

The following is an example of the use of the present invention. An electronic system, such as electronic system 10 in FIG. 1, has one primary I²C bus (I²C_0) and eight secondary I²C buses (I²C_1–I²C_8). The I²C_5 bus is attached to a backplane of a direct access storage device (DASD) having a SCSI support chip, an EEPROM and three thermal sensors. The DASD backplane is powered by a 5 V supply rail of the electronic system. The I²C_0 bus is powered from 3.3 V auxiliary supply rail so transactions can complete on the I²C_0 bus while the 5 V supply rail is powered off. When the 5 V supply rail is powered, the SCSI support chip that is located on the DASD backplane will begin self-programming by fetching code from the EEPROM. Since the SCSI support chip and the EEPROM communicate through the I²C_5 bus, such transaction would be seen by all devices that resided on the I²C_5 bus.

Given the conditions above, the electronic system's service processor, which is located on the I²C_0 bus, is programmed to periodically read the thermal sensors located on the I²C_5 bus. The service processor only reads the thermal sensors when the 5 V supply rail is powered. An error occurs when the SCSI support chip is performing its code load and the service processor attempts to read one of the thermal sensors. Since the service processor has no "visibility" to the transactions on the I²C_5 bus when switched to a bus other than the I²C_5 bus, the service processor will "blindly" switch the I²C multiplexor to the I²C_5 bus in preparation of reading the thermal sensors. When this situation occurs, the I²C_0 bus and the I²C_5 bus are logically connected. Since the service processor did not "see" the I²C START condition that started the SCSI support chip's code load, the service processor "thinks" the I²C bus is idle. The service processor then begins a transaction to read the thermal sensors located on the I²C_5 bus. The service processor's transaction then collides with the SCSI support chip's code load and causes the SCSI support chip to enter an invalid state. As a result, failures occur at the DASD subsystem.

The present invention would prevent the above-mentioned collision by delaying the I²C multiplexor switch event until both the "switch to" and "switch from" buses are idle. In the example above, the service processor would not have been allowed to switch to the I²C_5 bus until the SCSI support chip's code load had been completed. The service processor would then be notified of the completed switch with a SWITCH_DONE signal.

As has been described, the present invention provides an improved method and apparatus to support I²C bus masters on a secondary side of an I²C mulitplexor.

While the invention has been particularly shown and described with reference to a preferred embodiment, it will be understood by those skilled in the art that various changes in form and detail may be made therein without departing from the spirit and scope of the invention.

What is claimed is:

1. An electronic system, comprising:

a primary serial bus;

a plurality of secondary serial buses;

an expander coupled to said primary serial bus, said expander includes a plurality of outputs that can be selectively activated;

a plurality of direction latches, each coupled to a respective one of said outputs of said expander;

a multiplexor, coupled to said direction latches, includes a plurality of outputs, each connected to a respective one of said secondary serial buses such that each of said secondary serial buses can be selectively connected to said primary serial bus;

a plurality of busy detect circuits, each coupled to a respective one of said outputs of said multiplexor, for detecting if there is a transaction on one of said outputs of said multiplexor; and a to-from multiplexor circuit for selecting one of said busy detect circuits involved in said detected transaction to allow one of said direction latches to latch at a correct time in order to prevent any bus corruption on said secondary serial buses.

2. The electronic system of claim 1, wherein said primary serial bus is a primary I$^2$C bus and said plurality of secondary serial buses are secondary I$^2$C buses.

3. The electronic system of claim 1, wherein said direction latches are D flip-flops.

4. The electronic system of claim 1, wherein said multiplexor is a FET switch multiplexor.

5. The electronic system of claim 1, wherein said to-from multiplexor circuit includes a to multiplexor and a from multiplexor to generate a MUX_CLK signal for clocking said direction latches.

6. The electronic system of claim 1, wherein said electronic system further includes a switch done circuit for providing a SWITCH_DONE signal to notify an external circuit that a switch has been completed.

7. An electronic system, comprising:

a primary serial bus;

a plurality of secondary serial buses;

an expander coupled to said primary serial bus, said expander includes a plurality of outputs that can be selectively activated;

a plurality of direction latches, each coupled to a respective one of said outputs of said expander;

a multiplexor, coupled to said direction latches, includes a plurality of outputs, each connected to a respective one of said secondary serial buses such that each of said secondary serial buses can be selectively connected to said primary serial bus;

a plurality of busy detect circuits, each coupled to a respective one of said outputs of said multiplexor, for detecting if there is a transaction on one of said outputs of said multiplexor; and a bus select circuit for selecting one of said busy detect circuits involved in said detected transaction to allow one of said direction latches to latch at a correct time in order to prevent any bus corruption on said secondary serial buses.

8. The electronic system of claim 7, wherein said primary serial bus is a primary I$^2$C bus and said plurality of secondary serial buses are secondary I$^2$C buses.

9. The electronic system of claim 7, wherein said direction latches are D flip-flops.

10. The electronic system of claim 7, wherein said multiplexor is a FET switch multiplexor.

11. The electronic system of claim 7, wherein said busy select circuit includes only one to multiplexor for generating a MUX_CLK signal for clocking said direction latches.

12. The electronic system of claim 7, wherein said electronic system further includes a switch done circuit for providing a SWITCH_DONE signal to notify an external circuit that a switch has been completed.

* * * * *